United States Patent
Blythe et al.

(10) Patent No.: US 10,261,818 B2
(45) Date of Patent: *Apr. 16, 2019

(54) OPTIMIZING VIRTUAL MACHINE SYNCHRONIZATION FOR APPLICATION SOFTWARE

(71) Applicant: INTERNATIONAL BUSINESS MACHINES CORPORATION, Armonk, NY (US)

(72) Inventors: Christopher J. Blythe, Austin, TX (US); Michael H. Dawson, Ontario (CA); Curtis E. Hrischuk, Holly Springs, NC (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,011

(22) Filed: Feb. 10, 2015

(65) Prior Publication Data

US 2015/0154044 A1    Jun. 4, 2015

Related U.S. Application Data

(63) Continuation of application No. 14/105,354, filed on Dec. 13, 2013, now Pat. No. 8,990,829, which is a (Continued)

(51) Int. Cl.
| | |
|---|---|
| *G06F 9/455* | (2018.01) |
| *G06F 9/50* | (2006.01) |
| *G06F 11/34* | (2006.01) |

(52) U.S. Cl.
CPC ...... *G06F 9/45558* (2013.01); *G06F 9/45533* (2013.01); *G06F 9/50* (2013.01);
(Continued)

(58) Field of Classification Search
CPC ............. G06F 9/45558; G06F 9/45533; G06F 11/3409; G06F 11/3419; G06F 11/3442;
(Continued)

(56) References Cited

U.S. PATENT DOCUMENTS

| | | |
|---|---|---|
| 7,159,220 B2 | 1/2007 | Buch |
| 7,716,377 B2 | 5/2010 | Harris et al. |

(Continued)

OTHER PUBLICATIONS

R. Dimpsey, et al.; "Java server performance: A case study of building efficient, scalable Jvms"; INSPEC/IBM Systems Journal; vol. 39; No. 1; pp. 151-174; 2000.
(Continued)

*Primary Examiner* — Benjamin C Wu
(74) *Attorney, Agent, or Firm* — Sughrue Mion, PLLC

(57) ABSTRACT

Real-time application metrics of an application executed by a virtual machine are dynamically monitored by a controlling agent and analyzed to determine an optimal configuration of the virtual machine for executing the application. Based on the measured metrics, tunable parameters of the virtual machine may be adjusted to achieve desired application performance.

12 Claims, 7 Drawing Sheets

Related U.S. Application Data continuation of application No. 13/045,016, filed on Mar. 10, 2011, now Pat. No. 8,990,823.

(52) U.S. Cl.
CPC ...... *G06F 11/3409* (2013.01); *G06F 11/3419* (2013.01); *G06F 11/3442* (2013.01); *G06F 2009/45591* (2013.01); *G06F 2201/815* (2013.01)

(58) Field of Classification Search
CPC .................. G06F 9/50; G06F 2201/815; G06F 2009/45591
See application file for complete search history.

(56) References Cited

U.S. PATENT DOCUMENTS

| | | | |
|---|---|---|---|
| 7,716,446 B1 | 5/2010 | Chen et al. | |
| 7,774,762 B2* | 8/2010 | Rochette | G06F 8/61 717/138 |
| 8,286,174 B1* | 10/2012 | Schmidt | G06F 9/5077 709/226 |
| 8,468,523 B2 | 6/2013 | Shin et al. | |
| 2003/0037092 A1 | 2/2003 | McCarthy et al. | |
| 2003/0065704 A1 | 4/2003 | Buch | |
| 2003/0236816 A1 | 12/2003 | Venkatasubramanian | |
| 2004/0098723 A1 | 5/2004 | Radovic et al. | |
| 2004/0128670 A1 | 7/2004 | Robinson et al. | |
| 2005/0262504 A1 | 11/2005 | Esfahany et al. | |
| 2006/0195715 A1* | 8/2006 | Herington | G06F 9/5077 714/4.2 |
| 2006/0248042 A1 | 11/2006 | Anna Janssens | |
| 2007/0014363 A1* | 1/2007 | Golas | H04N 7/148 375/240.16 |
| 2009/0198766 A1 | 8/2009 | Chen et al. | |
| 2009/0265707 A1 | 10/2009 | Goodman et al. | |
| 2009/0328053 A1* | 12/2009 | Dice | G06F 9/461 718/104 |
| 2010/0023704 A1 | 1/2010 | Christie et al. | |
| 2010/0223217 A1 | 9/2010 | Little | |
| 2012/0011499 A1* | 1/2012 | Conover | G06F 9/45537 718/1 |

OTHER PUBLICATIONS

Rajeev Thakur, et al.; "Optimizing the Synchronization Operations in MPI One-Sided Communication"; Mathematics and Computer Science Division, Argonne National Laboratory; Google; 2004-2005, 18 pages.

Steve Dever, et al.; "New Compiler Optimizations in the Java Hot Spot Virtual Machine"; Sun Microsystems, Inc.; Google; 2006; pp. 1-65.

John Sartori, et al.; "Low-overhead, High-speed Multi-core Barrier Synchronization"; Coordinated Science Laboratory, University of Illinois at Urbana-Champaign; Google; 2008-2009, 15 pages.

VMware; "Best Practices Using VMware Virtual SMP"; Google; 2005, 8 pages.

Linux User's Manual, Apr. 2003, 3 pages.

IBM Systems Information Center; publib.boulder.ibm.com/infocenter/systems/index.jsp?topic=/com.ibm.aix.cmds/doc/aixcmds1/attachrset.htm, Feb. 18, 2011, 1 page.

Cox, et al.; "WebSphere Application Server V7 with VMware ESX 3.5"; Apr. 2009; Document Version [1.23], 28 pages.

Quirk, et al.; "WebSphere Application Server V7 with Power Virtualization"; May 2009; Document Version [1.72], 24 pages.

\* cited by examiner

OPTIMIZING VIRTUAL MACHINE SYNCHRONIZATION FOR APPLICATION SOFTWARE

CROSS-REFERENCE TO THE RELATED APPLICATIONS

This application is a continuation of U.S. patent application Ser. No. 14/105,354, filed on Dec. 13, 2013, in the U.S. Patent and Trademark Office, now U.S. Pat. No. 8,990,829, issued on Mar. 24, 2015, which is a continuation of U.S. patent application Ser. No. 13/045,016, filed Mar. 10, 2011, in the U.S. Patent and Trademark Office, now U.S. Pat. No. 8,990,823, issued on Mar. 24, 2015, the disclosures of which are incorporated herein by reference in their entireties.

BACKGROUND

1. Field

The present disclosure relates to virtual machine synchronization, and more particularly to optimizing virtual machine synchronization in a multi-core system for software programs running on the virtual machine.

2. Description of Related Art

Processor manufacturers are adding more processing cores per central processing unit (CPU) housing in order to increase processing capacity of the CPU. However, it is not clear how to best harness those additional cores in a general processing environment.

BRIEF SUMMARY

According to embodiments, a method, system and computer program product is provided for optimizing performance of a virtual machine that includes a plurality of processing units, including measuring, by a container application of the system that controls the virtual machine, a metric of an application executed by the virtual machine and adjusting a tunable parameter of the virtual machine, based on the measured metric.

DETAILED DESCRIPTION

Figure 1:
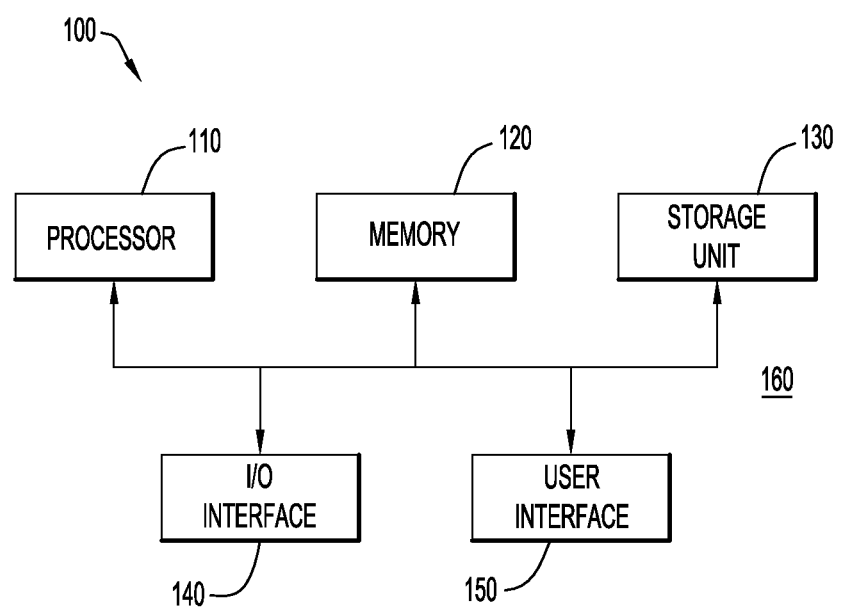
FIG. 1 is a block diagram illustrating a system to which the embodiments may be applied.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system to which the embodiments of the present invention may be applied.

Referring to FIG. 1, the system 100 may be a general purpose computer, special purpose computer, personal computer, server, or the like. The system 100 may include a processor 110, a memory 120, a storage unit 130, an I/O interface 140, a user interface 150, and a bus 160. The processor 110 may be a central processing unit (CPU) or microcontroller that controls the operation of the system 100 by transmitting control signals and/or data over the bus 160 that communicably connects the elements 110 to 150 of the system 100 together. The bus 160 may be a control bus, a data bus, or the like. The processor 110 may be provided with instructions for implementing and controlling the operations of the system 100, for example, in the form of computer readable codes. The computer readable codes may be stored in the memory 120 or the storage unit 130. Alternatively, the computer readable codes may be received through the I/O interface 140 or the user interface 150. As discussed above, the memory 120 may include a RAM, a ROM, an EPROM, or Flash memory, or the like. As also discussed above, the storage unit 130 may include a hard disk drive (HDD), solid state drive, or the like. The storage unit 130 may store an operating system (OS) and application programs to be loaded into the memory 120 for execution by the processor 110. The I/O interface 140 performs data exchange between the system and other external devices, such as other systems or peripheral devices, directly or over a network, for example a LAN, WAN, or the Internet. The I/O interface 140 may include a universal serial bus (USB) port, a network interface card (NIC), IEEE 1394 port, and the like. The user interface 150 receives input of a user and provides output to the user. The user interface 150 may include a mouse, keyboard, touchscreen, or other input device for receiving the user's input. The user interface 150 may also include a display, such as a monitor or liquid crystal display (LCD), speakers, and the like for providing output to the user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present disclosure will now be described more fully with reference to the accompanying drawings, in which embodiments are shown.

The following embodiments provide a system that monitors runtime metrics, analyzes the runtime metrics, and implements a feedback mechanism to dynamically adjust tunable parameters of a Java virtual machine (JVM), according to the measured and analyzed runtime metrics. (Java and all Java-based trademarks and logos are trademarks or registered trademarks of Oracle and/or its affiliates.)

Figure 2:
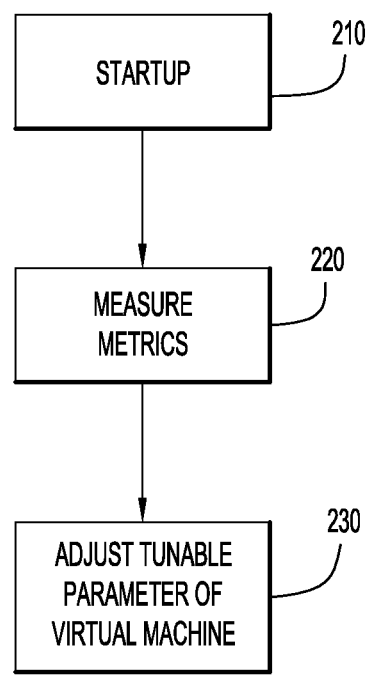
FIG. 2 illustrates a method of optimizing performance of a virtual machine, according to an embodiment.

FIG. 2 illustrates a method of optimizing performance of a virtual machine, according to an embodiment.

As illustrated in FIG. 2, in step 210, system startup begins. In step 220, runtime metrics are measured. Various metrics may be measured, including application metrics and hardware metrics, as will be discussed below in greater detail. In step 230, a tunable parameter of the JVM is adjusted to optimize performance of an application executed by the JVM.

Not only a single tunable parameter, but assorted tunable parameters may be adjusted to obtain desired application performance, as will also be discussed below in greater detail. Further, not only may tunable parameters of a single JVM be optimized, but tunable parameters across multiple JVM instances, which are common in larger multi-core systems, or in light of heavy CPU resource consumption from other non-Java processes, may be optimized. In this approach, the tunable parameters for each JVM are managed independently of the other JVM instances. With this solution, for example, an OS scheduler may provide the necessary balancing of CPU resource allocation (a tunable parameter). As an example, four JVM instances receiving equal load effectively consume 25% of the CPU resources on a system, and the OS scheduler is responsible for maintaining the balance. A round-robin allocation of CPU affinity settings across all CPUs may prevent each JVM instance from setting affinity to the same CPU. The CPU settings may be set when each JVM is launched and dynamically adjusted while each JVM operates. Accordingly, balance may be provided from the outset, as well as throughout operation of the each JVM.

A second methodology for optimizing multiple JVMs involves a coordinated approach using either a shared memory location to store essential affinitization and coordination data between the JVM instances or an active coordinating agent.

In an enterprise, tens, hundreds, or thousands of JVMs may be simultaneously executed. The dynamic adjustment mechanism may be coordinated across multiple JVMs using the centralized coordinating agent or decentralized using the shared statistical data. For example, an application instance running on a small number of cores performs well with spinning disabled. However, as CPUs and workload demand increase, spinning must increase to a certain degree while still allowing threads to sleep long enough to avoid being woken up prematurely by a scheduler. Accordingly, using the centralized coordinating agent or the shared statistical data, spinning can be appropriately controlled for the applications executed on the JVMs. In another example, using the centralized coordinating agent or the shared statistical data, CPU affinity can be adjusted across multiple applications on JVM instances to dynamically respond to changing workload requirements to prevent scheduling inefficiencies associated with context switching, thread migration, and cache locality in large multi-core systems.

Figure 3:
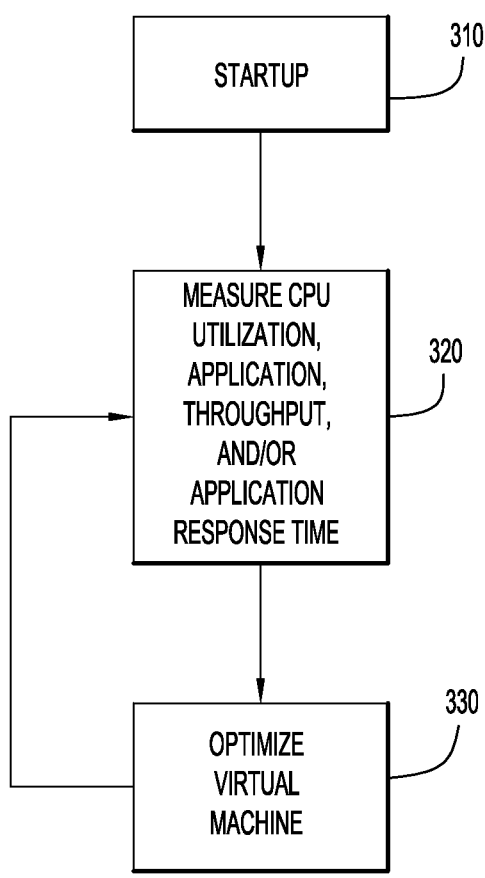
FIG. 3 illustrates a method of measuring performance of a virtual machine, according to an embodiment.

FIG. 3 illustrates a method of measuring performance of a virtual machine, according to an embodiment.

Production environments contain dynamic workloads where application demand varies with time. Furthermore, a single piece of hardware typically hosts a heterogeneous mix of applications, each with unique peak demand periods. Static tuning is too simplistic for such a dynamic environment, since performance requirements are constantly changing. According to this embodiment, tunable parameters of a JVM, for an application executed by the JVM, are dynamically optimized based on runtime application and/or hardware metrics, which may be collected intermittently through small artificially inserted micro-benchmarks or by injecting application specific performance metrics via Java Management Extensions (JMX) beans or a Performance Monitoring Interface (PMI).

The JVM may be dynamically optimized by a controlling agent. The controlling agent may be an application that runs at a higher level on top of the JVM. Since the application operates at a higher level than the JVM, the application is aware of metrics not available to the JVM. Alternatively, the controlling agent may be a middleware application (MA) that controls execution of applications running under the JVM. Again, since the MA operates at a level higher than the JVM, the MA is aware of metrics not available to the JVM. Alternatively the controlling agent may be an application, process or other entity running outside of the JVM that can capture application metrics not available to the JVM. The controlling agent may be executed on a system local to the JVM or remotely from a system external to the JVM. Using the runtime metrics monitored by the controlling agent, the JVM may be adjusted to significantly improve performance of executed applications due to hardware cache locality and synchronization efficiency. For example, if 20% CPU utilization of a JVM is detected on an 8-core server, the JVM is consuming 1.6 of the system's processors. This information allows the controlling agent to select a CPU affinity to optimize the current workload. In this case, it would be appropriate to set a CPU affinity which allocates two processors to the application executed by the JVM.

As discussed above, an approach to increasing multi-core efficiency for Java processes is to manipulate processor affinity, which is a hardware metric that may be used to optimize performance. Performance gains through processor affinity are largely enabled by increasing temporal and spatial locality of data and code, and these gains can be significant. However, conventional processor affinity configuration is a manual process that requires knowledge of the specific operating system (OS) and physical hardware. Not only do individuals need to have specialized skills to configure processor affinity, but the administration overhead can become significantly challenging in the enterprise due to the scale of systems involved and the presence of heterogeneous hardware architectures and operating systems.

As illustrated in the dynamic configuration of FIG. 3, in step 310, system startup beings. In step 320, runtime metrics are measured. More specifically, in step 320, a utilization rate of the processing units allocated to the JVM for executing the application may be measured. Alternatively, in step 320, throughput of the application executed by the JVM may be measured. Further, in step 320, a response time of the application executed by the JVM may be measured.

As described above, in step 320, any one of the utilization rate of the processing units allocated to the JVM for executing the application, the throughput of the application executed by the JVM, or the response time of the application executed by the JVM may be monitored. However, any combination of metrics including the utilization rate of the processing units allocated to the JVM, the throughput of the application executed by the JVM, and the response time of the application executed by the JVM may be monitored.

An example of how data for the runtime metrics may be collected is shown in the following format (Table 1):

| | |
|---|---|
| Experiment | Ei |
| Start Time | Ds |
| End Time | De |
| Incoming Request | Ti |
| Outgoing Request | To |
| CPU List | CPUa, CPUb . . . |
| CPU Utilization | UTILa, UTILb . . . |
| Spin Strategy | Sn |

In Table 1, Ei is the experiment index, Ds is the start time (milliseconds), De is the end time (milliseconds), the CPUa, CPUb . . . are the list of CPUs (with affinity), UTILa, UTILb . . . are the CPU utilization (%) for each of the CPUs in the CPU list, Ti is the number of client requests received by the application server, To is the number of client requests completed by the application server, and Sn is the spin strategy that controls spinning in locks within the JVM.

From this data, the following metrics may be derived:

$D_{tot} = D_e - D_s$ (Duration of experiment)

$T_{avg} = R_o / \text{Duration}$ (Average throughput)

$T_{cpu} =$ Average % CPU per request $R_{avg} = \text{Duration}/R_o$ (Average response time)

This data may be consumed by a tuning algorithm to determine the optimal scaling strategy for the current workload. Accordingly, in step 330, tunable parameters of the JVM are adjusted to optimize execution of the application on the JVM, using the measured metrics, which may be hardware metrics such as the processor affinity or software metrics such as the throughput and response time of the application executed by the JVM. As a result, a configuration (CPU list and/or spin strategy) that optimizes throughput and/or response time, either of which can be specified by the application, may therefore be applied.

The skilled artisan will understand that processor utilization and application throughput and response time are merely examples of hardware and software metrics, respectively, which may be measured and analyzed to determine whether tunable parameters of the JVM are to be adjusted to optimize execution of an application executed by the JVM, and other hardware and software metrics may be measured and analyzed. Further, the skilled artisan will understand that the processor affinity and spin strategy are merely examples of tunable parameters of the JVM that may be adjusted to optimize the JVM for desired application performance, and other tunable parameters of the JVM may be adjusted.

Moreover, the embodiments discussed below present the case in which a JVM executes a single application. However, the skilled artisan will understand that the JVM may execute one or more applications, and that metrics for each application may be measured and analyzed to optimize tunable parameters for each application executed by the JVM. On the other hand, the JVM may execute one or more applications, and metrics of the JVM may be measured and analyzed to optimize tunable parameters for the JVM executing the one or more applications.

Figure 4:
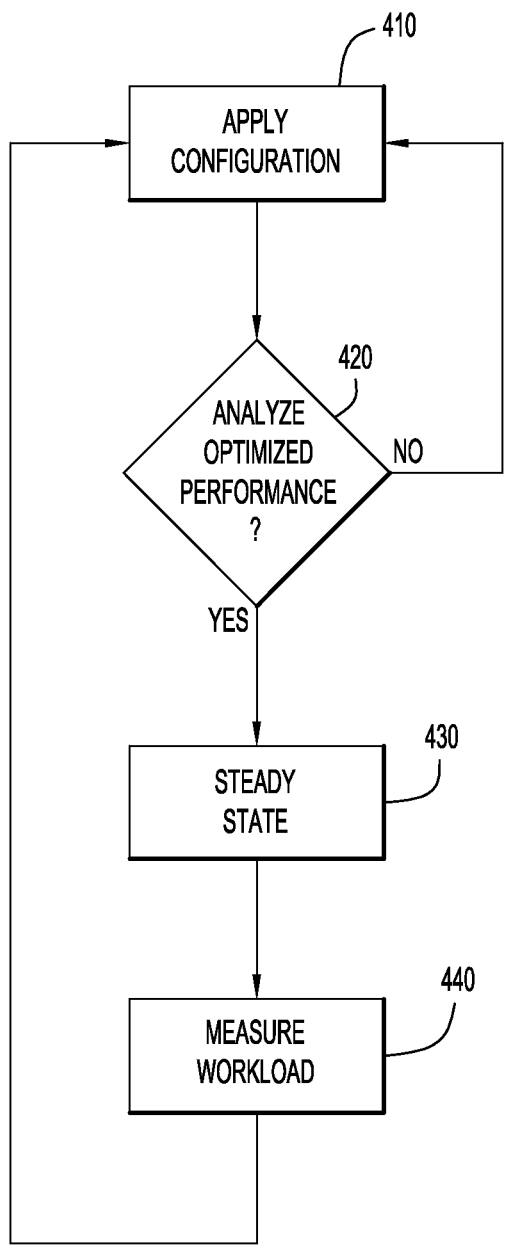
FIG. 4 illustrates a method of optimizing performance of a virtual machine, according to an embodiment.

FIG. 4 illustrates a method of optimizing performance of a virtual machine, according to an embodiment.

In FIG. 4, tunable parameters of the JVM may be set to initially optimize the JVM for desired application performance. The initialized tunable parameters may be set according to a user's input. Alternatively, the initialized parameters may be set to default parameter values or may be initialized according to an algorithm that estimates optimal performance of the application executed by the JVM based on hardware metrics, such as a maximum number of processors available to be allocated to the JVM for executing the application, a number of applications executed by the system, or a number of applications executed by the JVM. The controlling agent may initially set the tunable parameters. As discussed above, since the controlling agent, which may be a MA, operates at a high level, the controlling agent is aware of parameters not available to the JVM, such as the number of applications executed by the system.

The optimizing may be implemented by the controlling agent executing a tuning algorithm that includes an "apply experimental configuration" step 410 and an "analyze" step 420.

During the step 410, the system temporarily sets the tunable parameters for the JVM. The tuning strategy may be chosen by selector functions getCPUList( ) and getSpin-Strategy( ) as shown in the pseudocode below. Once the selected configuration has been applied, the runtime metrics are measured over a duration and the controlling agent of the system captures statistics, as described above.

```
function ApplyExperimentalConfiguration ( ) {
    //choose and apply CPU affinity settings, CPUList
    CPUList = getCPUList( )
    apply(CPUList)
    //choose and apply JVM spin configuration, Se
    Se = getSpinStrategy( )
    apply(Se)
    //capture statistics for a given duration
    collectStatistics(timespan)
}
```

In the function above, apply( ) may be a function to update a tunable parameter during runtime. In the example of the apply( ) function above, the function is passed the parameter "CPUList" and updates the processor affinity of the JVM using the "CPUList."

Selectors functions heuristically determine an experimental configuration of tunable parameters to evaluate. In the example above, the selector functions getCPUList( ) and getSpinStrategy( ) heuristically determine an experimental CPU affinity and spin strategy, respectively, to evaluate. For example, the CPU selector function starts by assigning the JVM to a single CPU in a first experiment (i.e., in a first iteration). If the resulting CPU utilization is high, a subsequent experimental configuration in a next iteration might add an additional processor to the CPU affinity to determine whether the performance of the application could benefit from additional CPUs being allocated to the JVM. The selector function may also consider configurations of other application instances on the same system. For example, the CPU selector may consider the CPU affinities of other application instances on the system, and provide common CPU affinities to the application instances to minimize CPU overlap and reduce cache misses.

The selector functions may select configurations of tunable parameters from among various configurations. For example, the getSpinStrategy( ) selector chooses a spin strategy to monitor from among a set of N spin configurations. The set might include a default JVM (three tier) spin setting, a setting in which spinning is completely disabled, or a setting including specific tiers with disabled spinning, etc. From this set, the selector function chooses an available spin configuration based on measured runtime metrics. The measured runtime metrics may include a most recent measurement, or may measure and store metrics over a period of time as an experiment history. Since workloads are dynamic, the algorithm may adjust tunable parameters over time to meet the changing requirements.

The "analyze" step 420 evaluates tunable parameters selected in an experimental result and determines whether the system should continue with active experimentation or move to a steady state 430. For example, measurements of runtime metrics which occur at high throughput or high resource usage better represent the situations that are most important (i.e., low resource usage usually means that response time is best since there is no queuing or resource competition). For this reason, high throughput or high resource usage measurements in the history may be filtered and weighed more heavily when evaluating configurations of tunable parameters. The controlling agent selects tunable parameters settings of the JVM in the experimental result that provides the best application performance.

The following pseudocode describes the logic for the analyze process:

```
function Analyze ( ) {
    bestCaseIndex = CURRENT_CONFIGURATION_INDEX
    bestCaseScore = CURRENT_CONFIGURATION_SCORE
    for each (experiment) {
        score = F(Ravg, To, Dtot, UTILavg)
        if (score < bestCaseScore) {
            bestCaseIndex = Ei
            bestCaseScore = score
        }
    }
    return bestCaseIndex
}
```

In the function above, F(Ravg, To, Dtot, UTILavg) is a function that evaluates the measured runtime metrics of response time, completed requests, experiment duration, and CPU utilization. These input values may be used to produce a weighted score, based on minimized response time (Ravg) and average % CPU per transaction (Tcpu). This function F( ) can be selected by the controlling agent based on knowledge about the system or the application. An example function F( ) is provided below.

```
function F (Ravg, Te, Dtot, UTILavg) {
    Tavg = Te/Dtot        //average requests per second
    Tcpu = UTILavg/Tavg   //average % CPU per request
    //Lower score is better
    //CPU utilization and LONGER duration.
    return (Ravg + Tcpu/UTILavg)/Dtot
}
```

Once the experimental result, which provides the best application performance in step 420, is determined, the configuration of tunable parameters is applied in step 430. The system may then measure the runtime metrics of the system in step 440, and the process repeats. As a result, the performance of a JVM is dynamically optimized.

Figure 5:
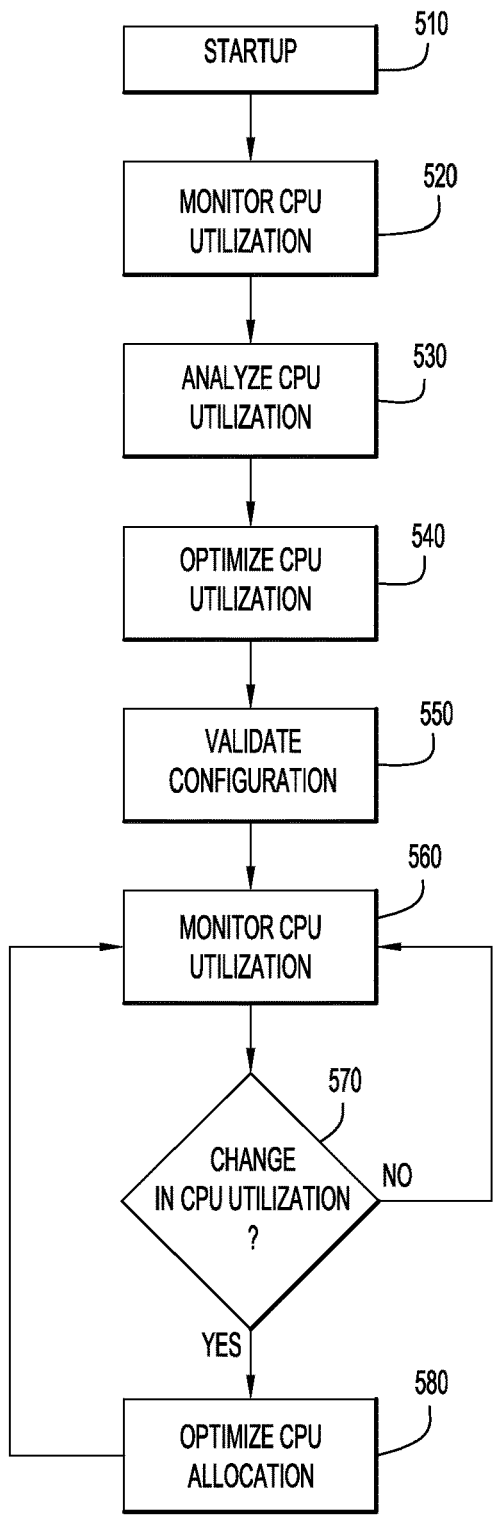
FIG. 5 illustrates a method of optimizing performance of a virtual machine, according to an embodiment.

FIG. 5 illustrates a method of optimizing performance of a virtual machine, according to an embodiment.

As illustrated in FIG. 5, in step 510, system startup beings. In step 520, a utilization rate of the processing units allocated to the JVM is determined by the controlling agent. Using the CPU utilization metric, an approximate number of physical CPUs the JVM is using under the current load is determined, in step 530. Based on a result of the determination, in step 540, allocation of the processing units to the JVM is adjusted.

In step 550, after a new CPU affinity has been chosen, the software and/or hardware runtime metrics to monitor system health and validate the new configuration. The measurement of runtime metrics may be performed with respect to FIG. 5, as discussed above.

Since workloads vary over time, the tunable parameters may change over time. For example, the controlling agent may expand or shrink the CPU capacity over time. This functionality is enabled by a three-fold process: (1) sliding window for CPU utilization and application metric measurement; (2) managing CPU affinity ramp-up threshold; and (3) managing CPU affinity ramp-down threshold.

All metrics may be measured regularly over a configurable sliding window (i.e. the last N seconds) to indicate the changing nature of enterprise workloads. In step 560, CPU utilization is monitored. In step 570, it is determined whether CPU utilization is increasing or decreasing. For example, if the CPU utilization shows an increasing or decreasing trend (step 570—YES), the controlling agent can reevaluate the current affinity mask and apply a new mask to fit the changing load, in step 580. This allows the controlling agent to adapt to traffic spikes and slow periods by increasing or decreasing the CPU capacity of the JVM. If the CPU utilization does not show an increasing or decreasing trend (step 570—NO) or after optimizing the CPU utilization (step 580), the process returns to monitoring the CPU utilization.

Since a JVM is restricted to a set of processors, this has the potential to "throttle" a JVM's application performance. The dynamic method illustrated in FIG. 4 easily overcomes this limitation through by managing the CPU affinity ramp-up threshold. For example, when it is observed that a process reaches a certain utilization of the assigned CPU (i.e. 80% utilization), a new CPU is automatically added to the current CPU affinity. This preemptively adds capacity for a new load. Again, the sliding window measurement of CPU utilization enables this information to be monitored. Furthermore, it is monitored that a given CPU resource is no longer required by the workload (i.e., when the utilization falls to a certain threshold), the CPU affinity is adjusted to release the CPU.

Additionally, in a JVM, a "rogue threads" may run away with a CPU. For example, an infinite loop in application code may cause all the processors to be allocated to the infinitely looping JVM. The method in FIG. 4 easily may detect this condition by correlating an increase in CPU time with an increase in throughput, since the controlling agent may collect metrics for application metrics, such as application throughput and response time, as well as hardware metrics, such as the CPU utilization. Therefore, the monitored application metrics may be used as a safeguard to validate the increase in CPU resource. If a JVM's CPU time is increasing without a relative increase in application metrics, CPUs may be removed from the process in an effort to quarantine the process and reduce the impact of the misbehaving code.

Figure 6:
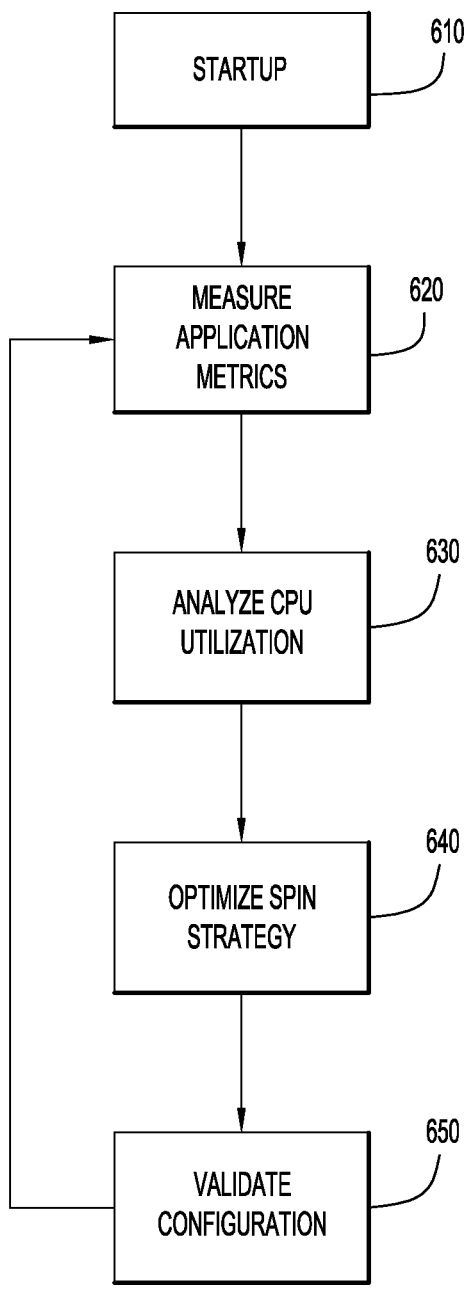
FIG. 6 illustrates a method of optimizing performance of a virtual machine, according to an embodiment.

FIG. 6 illustrates a method of optimizing performance of a virtual machine, according to an embodiment.

A spin strategy used for Java locks in a JVMs can significantly affect the overall performance of the application executed by the JVM. For example, for a computer with a larger number of CPUs, disabling spinning may decrease the performance of the application executed by the JVM. Similarly, performance drops are expected when spinning on Java locks is disabled across machines with different number of CPUs. On the other hand, disabling spinning may improve performance for certain configurations. Accordingly, dynamically managing a spin strategy, based on a workload, improves performance of the application executed by the JVM.

As illustrated in FIG. 6, in step 610, system startup beings. In step 620, runtime metrics of the JVM are determined. For example, as discussed above with respect to FIG. 3, the runtime metrics may be application metrics that include application throughput and application response time. In step 630, the measured runtime metrics are analyzed to determine whether a desired application metric conforms with a desired application performance level. For example, the desired application performance level may be a throughput rate and/or a desired response time.

In view of the analyzed metrics, the spin strategy for the application executed by the JVM is optimized, in step 640. The spin strategy may be to disable spinning, enable spinning while waiting for a lock, or to partially enable spinning while waiting for a lock. In the latter case, a thread partially spinning may request a lock for an amount of time or for a number of request cycles, and if the lock is not obtained after the amount of time or the number of request cycles, the thread may sleep until the lock becomes available.

The amount of time and the number of cycles may be determined based on one or more of the desired application metrics.

In step 650, after a new spin strategy has been chosen, the throughput and/or response time metrics are used to monitor system health and validate the new configuration. The measurement of the throughput and/or response time metrics may be performed with respect to FIG. 5, as discussed above, and the process repeats.

Figure 7:
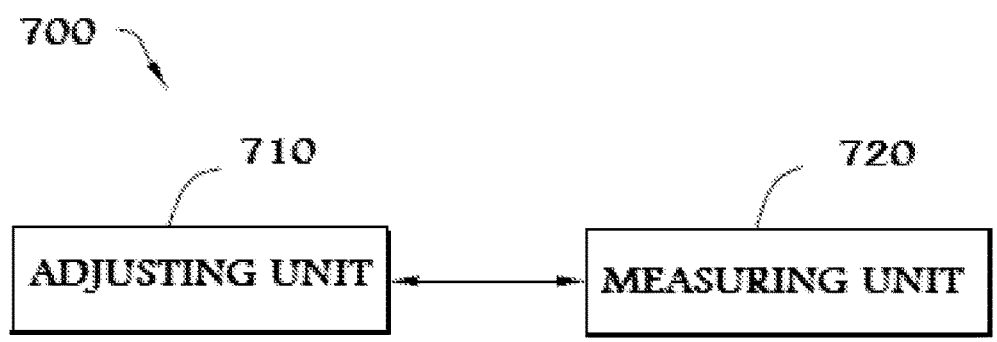
FIG. 7 illustrates a system for optimizing performance of a virtual machine, according to an embodiment.

FIG. 7 illustrates a system for optimizing performance of a virtual machine, according to an embodiment.

As illustrated in FIG. 7, the system 700 may include a measuring unit 710 and an adjusting unit 720. The system 700 may be a general purpose computer, special purpose computer, personal computer, server, or the like, as discussed above with respect to FIG. 1, and may include one or more processors (not shown) for executing the JVM.

The measuring unit 710 may measure runtime metrics, such as a utilization rate of the processing units allocated to the JVM for executing the application, throughput of the application executed by the JVM, and/or a response time of the application executed by the JVM.

The adjusting unit may adjust a tunable parameter of the JVM to optimize performance of an application executed by the JVM, using the measured metrics, which may be hardware metrics such as the processor affinity or software metrics such as the throughput and response time of the application executed by the JVM. As a result, a configuration (CPU list and/or spin strategy) that optimizes throughput and/or response time, either of which can be specified by the application, may therefore be applied.

Accordingly, consistent with the FIGS. 2 to 6 discussed above, the measuring unit 710 may measure metrics and perform operations in conjunction with the adjusting unit 720 to optimize performance of the virtual machine.

As described above, execution of an application on a virtual machine in a multi-core system may be dynamically optimized based on hardware metrics and application metrics. As a result, tunable parameters of the JVM may be adjusted to achieve desired performance benchmarks of executed applications.

What is claimed is:

1. A method of optimizing performance of a virtual machine executed by a system that includes a plurality of physical processing units, the method comprising:
    measuring, by a controlling agent of the system running outside of the virtual machine that controls the virtual machine, a metric of an application executed by the virtual machine, the metric comprising a hardware metric of the system upon which the virtual machine is executed that is unavailable for measurement by the virtual machine, wherein the hardware metric comprises a utilization rate of physical processing units among the plurality of physical processing units according to a processor affinity of the virtual machine allocated to the virtual machine to which servicing of the application is restricted; and
    adjusting a plurality of tunable execution parameters of the virtual machine for optimizing execution of the application based on the measured metric, wherein the plurality of tunable execution parameters comprises an allocation of the plurality of physical processing units according to the processor affinity of the virtual machine, to which servicing of the application is restricted, allocated to the virtual machine and a spin strategy that controls spinning in locks used for synchronization within the virtual machine.

2. The method according to claim 1, wherein the adjusting comprises:
    transmitting, by the controlling agent, a request to the virtual machine to adjust the plurality of tunable execution parameters; and
    adjusting, by the virtual machine, the plurality tunable execution parameters in response to the transmitted request.

3. The method according to claim 1, further comprising:
    restricting the virtual machine to an initial allocation of processing units among the plurality of physical processing units according to the processor affinity of the virtual machine and setting the spin strategy to an initial spin strategy,
    wherein the measuring comprises measuring the metric of the virtual machine allocated the initial allocation of processing units according to the processor affinity of the virtual machine and set to the initial spin strategy.

4. The method according to claim 1, wherein the adjusting comprises:
    increasing the allocation of the plurality of processing units according to the processor affinity of the virtual machine among the plurality of physical processing units to which servicing of the virtual machine is restricted in response to measuring an increased utilization rate; and
    decreasing the allocation of the plurality of processing units according to the processor affinity of the virtual machine among the plurality of physical processing units to which the servicing of the virtual machine is restricted in response to measuring a decreased utilization rate.

5. The method according to claim 1, wherein the spin strategy comprises disabling spinning while waiting for the synchronization lock to be freed or continuous spinning while waiting for the synchronization lock to be freed.

6. The method according to claim 1, wherein the measuring comprises intermittently measuring the metric over a period of time, and
    wherein the adjusting comprises adjusting the plurality of tunable execution parameters, based on the intermittently measured metric.

7. A system for optimizing performance of an application executed by a virtual machine, the system comprising:
    at least one processor configured to implement a controlling agent of the system running outside of the virtual machine that controls the virtual machine, the controlling agent comprising:
        a measuring unit that measures a metric of an application executed by the virtual machine, the metric comprising a hardware metric of the system upon which the virtual machine is executed that is unavailable for measurement by the virtual machine, wherein the hardware metric comprises a utilization rate of physical processing units according to a processor affinity of the virtual machine among the plurality of physical processing units allocated to the virtual machine to which servicing of the application is restricted; and
        an adjusting unit that adjusts a plurality of tunable execution parameters of the virtual machine for optimizing execution of the application based on the measured metric, wherein the tunable execution parameter comprises an allocation of the plurality of physical processing units according to the processor affinity of the virtual machine, to which servicing of the application is restricted, allocated to the virtual machine and a spin strategy that controls spinning in locks used for synchronization within the virtual machine.

8. The system according to claim 7, wherein measuring unit transmits a request to the virtual machine to adjust the plurality of tunable execution parameters, and wherein the adjusting unit adjusts the plurality of tunable execution parameters in response to the transmitted request.

9. The system according to claim 7, wherein the virtual machine is restricted to an initial allocation of processing units among the plurality of physical processing units according to the processor affinity of the virtual machine and the spin strategy is set to an initial spin strategy, and wherein the measuring unit measures the metric of the virtual machine allocated the initial allocation of processing units according to the processor affinity of the virtual machine and set to the initial spin strategy.

10. The system according to claim 7, wherein the adjusting unit increases the allocation of the plurality of processing units according to the processor affinity of the virtual machine among the plurality of physical processing units to which servicing of the virtual machine is restricted in response to measuring an increased utilization rate, and decreases the allocation of the plurality of processing units according to the processor affinity of the virtual machine among the plurality of physical processing units to which the servicing of the virtual machine is restricted in response to measuring a decreased utilization rate.

11. The system according to claim 7, wherein the spin strategy comprises disabling spinning while waiting for the synchronization lock to be freed or continuous spinning while waiting for the synchronization lock to be freed.

12. The system according to claim 7, wherein the measuring unit intermittently measures the metric over a period of time, and wherein the adjusting unit adjusts the plurality of tunable parameters based on the intermittently measured metric.

* * * * *